United States Patent Office 2,751,903
Patented June 26, 1956

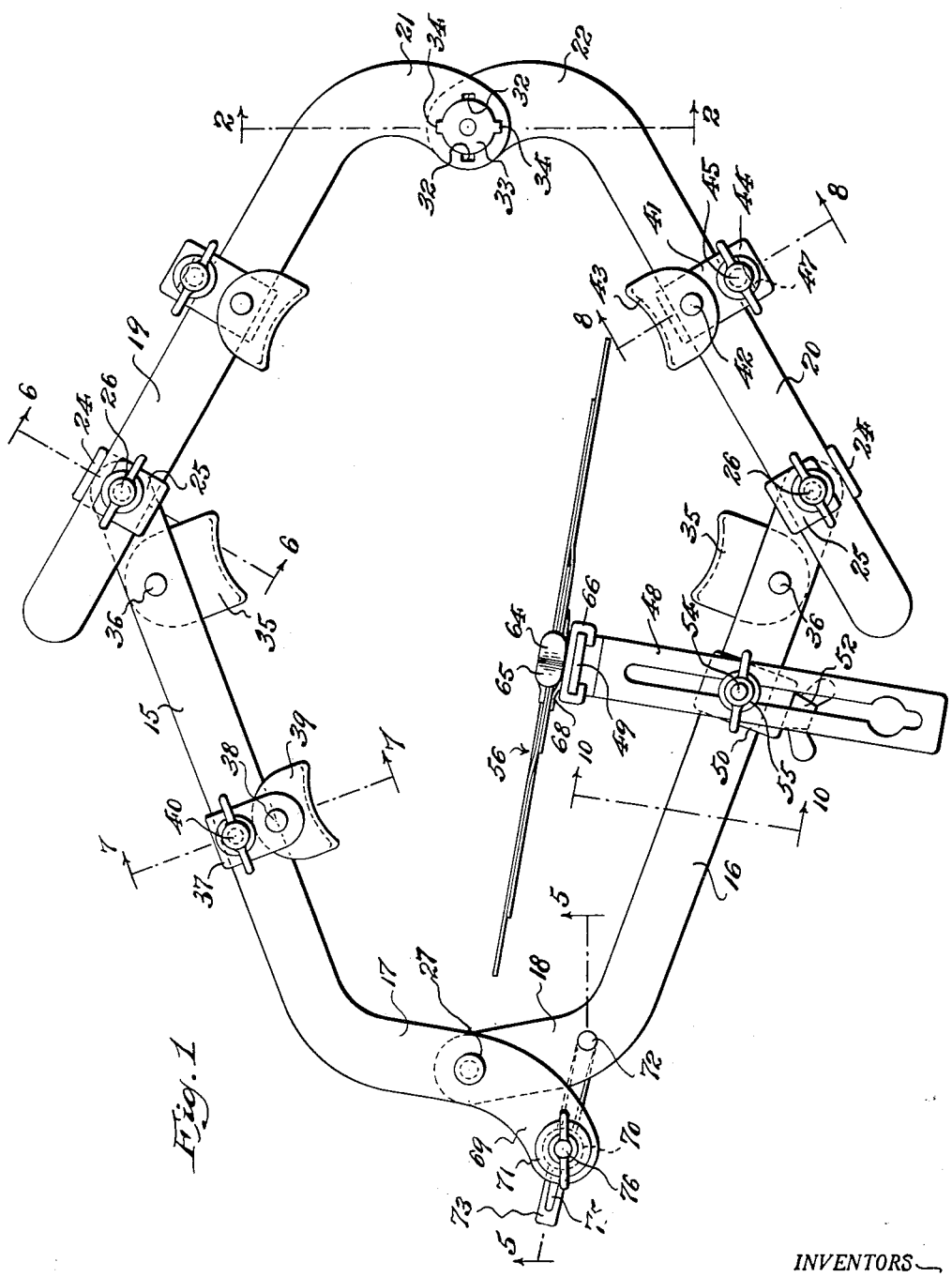

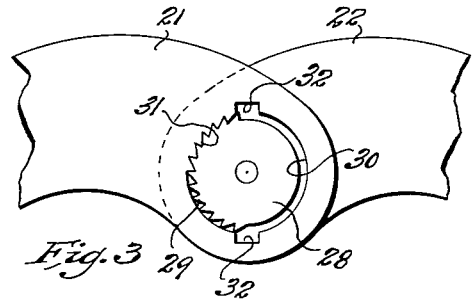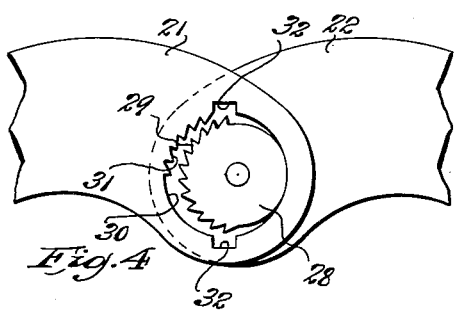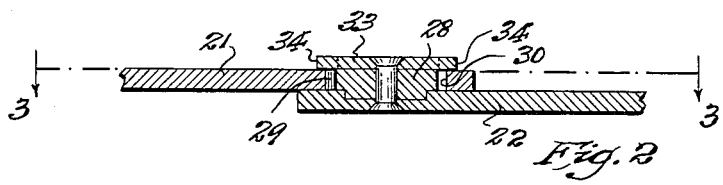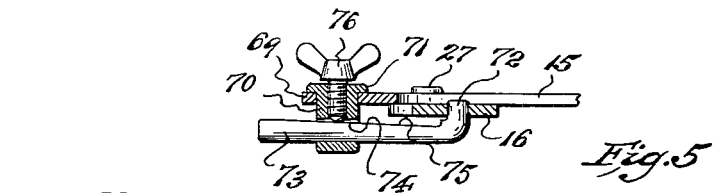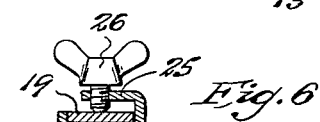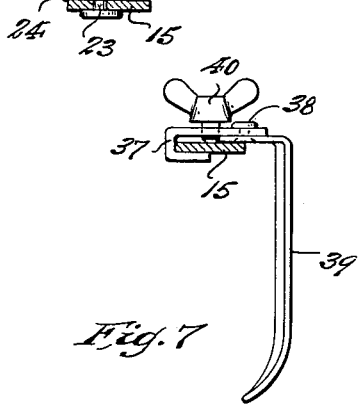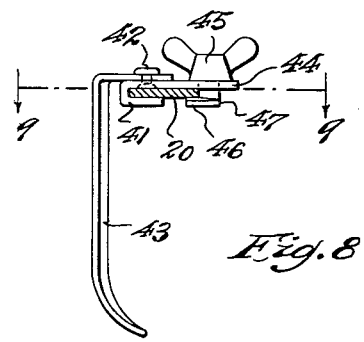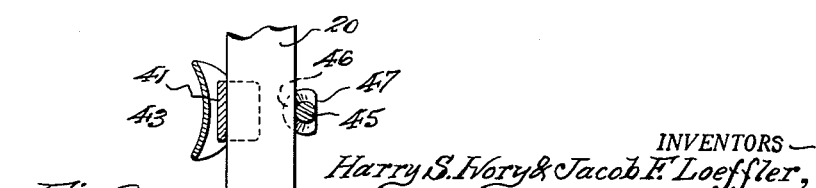

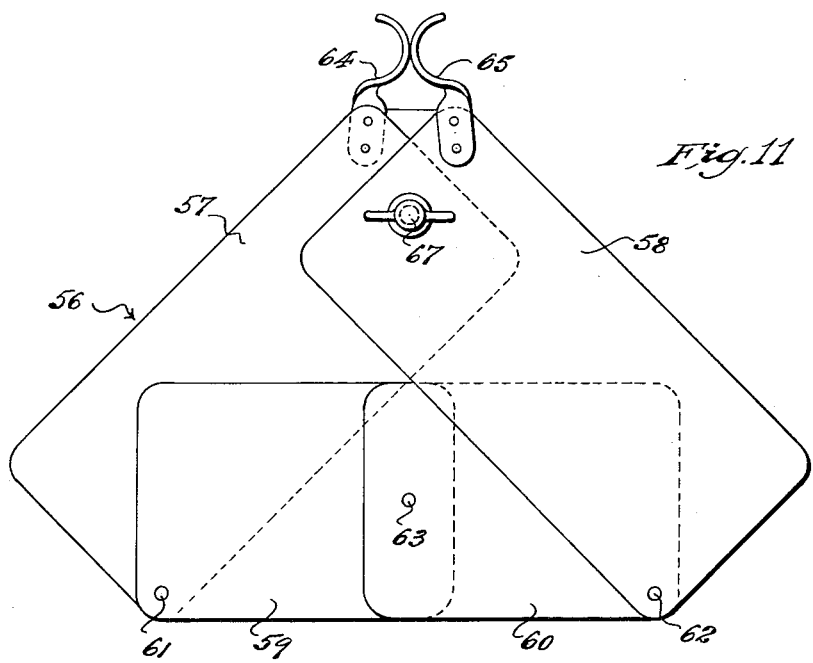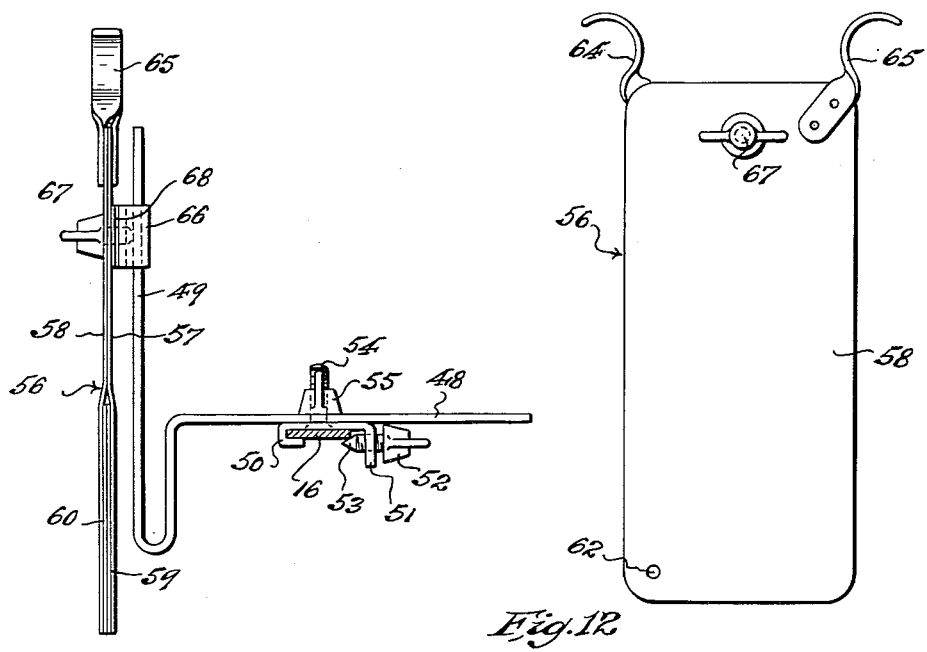

2,751,903

ADJUSTABLE RETRACTOR FOR SURGICAL USE

Harry S. Ivory and Jacob F. Loeffler, Point Pleasant, N. J.

Application April 22, 1954, Serial No. 424,932

9 Claims. (Cl. 128—20)

This invention relates to retractors for surgical use, especially in connection with performance of abdominal surgery; and the invention has reference, more particularly, to an improved incisional retractor adapted to engage the margins of an incision in an abdominal wall or other incised area, whereby to spread open and hold open said wall so as to give the operating surgeon unimpeded access to internal organs necessary to be operated upon.

The invention has for an object to provide an improved surgical retractor which is easily and quickly adjustable both as to length and width, and also as to the outline shape of its spread condition; and which is provided with novel means to permit width adjustment, which functions in such manner that an attained adjusted width is automatically retained by the tensional pressure exerted upon the retractor by the spread margins of the incision in which the retractor is engaged.

The invention has for a further object to provide, in combination with the novel retractor frame which is adjustable both as to length, width and shape, various forms of retractor devices and means for detachably mounting the same on said frame in selected locations thereon, including an adjustably mounted expansible supplementary retractor device operative to engage and hold away and blocked off from the operational area, body structures which would, in their normal positions, otherwise impede the operating surgeon's view of and access to said operational area.

The above and other objects will be understood from a reading of the following description of this invention in connection with the accompanying drawings showing an illustrative embodiment thereof, in which drawings:

Fig. 1 is a plan view of an incisional retractor frame according to this invention as operatively expanded, and showing various retractor devices mounted thereon in positions to operatively engage and retract margins of an incised abdominal wall or other incised area, including an expansible supplementary retractor device operative to engage and hold away and blocked off, from the operational area, body structure desired to be displaced from said area.

Fig. 2 is a fragmentary vertical sectional view of a self-locking adjustable joint with which one end of the retractor frame is provided, said view being taken on line 2—2 in Fig. 1, but drawn on an enlarged scale; Fig. 3 is a horizontal sectional view of the same, taken on line 3—3 in Fig. 2, showing the locking means thereof engaged to hold the retractor frame in adjusted expanded condition; and Fig. 4 is a view similar to that of Fig. 3, but showing the locking means released to permit collapse of the retractor frame.

Fig. 5 is a fragmentary vertical sectional view of a manipulatable safety lock joint with which the opposite end of the retractor frame is provided, said view being taken on line 5—5 in Fig. 1.

Fig. 6 is a fragmentary cross-sectional view of a coupling means by which cooperative sections of the retractor frame can be joined and relatively adjusted to predetermine the length of the frame, this view being taken on line 6—6 in Fig. 1.

Fig. 7 is a fragmentary cross-sectional view, taken on line 7—7 in Fig. 1, showing in elevation a retractor finger and one form of means for detachably mounting the same on the retractor frame.

Fig. 8 is a fragmentary cross-sectional view, taken on line 8—8 in Fig. 1, showing in elevation a retractor finger and another form of means for detachably mounting the same on the retractor frame; and Fig. 9 is a horizontal sectional view, taken on line 9—9 of Fig. 8.

Fig. 10 is a fragmentary cross-sectional view, taken on line 10—10 in Fig. 1, showing in side elevation the expanded supplementary retractor device operative to engage and hold away and block off, from the operational area, body structures desired to be displaced from said area; Fig. 11 is a front fact view of the supplementary retractor device in its expanded condition; and Fig. 12 is a front face view of said supplementary retractor device in its contracted or collapsed condition.

In the drawings, wherein like characters of reference indicate corresponding parts, is shown an incisional retractor embodying this invention, the same comprising a frame formed by end to end connected oppositely extending sections; one section comprising a pair of frame bars 15 and 16 which are preferably respectively provided at their outer ends with inwardly and laterally offset elbows 17 and 18, by which said frame bars are pivotally connected together, and the other section likewise comprising a pair of frame bars 19 and 20 which are also preferably respectively provided at their outer ends with inwardly and laterally offset elbows 21 and 22, by which these frame bars are pivotally connected together. The inner end portions of the frame bars of said sections of the retractor frame are adjustably and pivotally connected together, thus providing a retractor frame of polygonal shape which is capable of expansion and contraction, and which can be adjusted to vary its polygonal shape.

Means is provided for adjustably and pivotally coupling together the inner meeting end portions of the frame bars 15 and 19, and the inner meeting end portions of the frame bars 16 and 20 (see Figs. 1 and 6), whereby to join the frame sections in retractor frame forming relation. To this end, pivotally connected with the inner end portion of the frame bar 15, by a pivoting rivet 23 or the like, is a transversely channeled coupler member 24 through which the inner end portion of the frame bar 19 slidably extends. Projecting upwardly from one side of the coupler member 24, in offset overhanging relation to the inner end portion of the frame bar 19 engaged in the latter, is a tongue 25 through which is threaded a set or clamp screw 26. After the frame bar 19 is longitudinally adjusted relative to the frame bar 15, said bars are secured in their adjusted relation by turning home said set or clamp screw 26, thereby clamping said frame bar 19 to the coupler member 24. Since the coupler member 24 is pivotally connected to the frame bar 15, it will be free to turn thereon, so that the frame bars 15 and 19 can be swung, relative one to the other, with selected angular disposition. A like coupling means joins the inner meeting ends of the frame bars 16 and 20.

The lapped elbows 17 and 18 of the frame bars 15 and 16 are pivotally interconnected by a pivoting bolt means 27 or the like, so that said frame bars are capable of swinging movements, about such pivotal connection, toward and from one another.

The lapped elbows 21 and 22 of the frame bars 19 and 20 are pivotally interconnected so as to be capable of swinging movements toward and from one another. The means for thus pivotally interconnecting the frame bars 19 and 20 also includes releasable means for automatically holding said bars in adjusted swung apart relation against inswinging movement under conditions and for purposes hereinafter more fully explained in connection with the operation of the retractor frame in use. Said means comprises the provision on the elbow of one of said frame bars, e. g. the elbow 22 of frame bar 20, in fixed attachment thereto, of a pivoting hub 28, which is provided around an outer portion of its periphery with a series of male ratchet teeth 29 along approximately one-half of its circumference. Said pivoting hub 28 projects into an opening 30 with which the elbow of the other frame bar, e. g. the elbow 21 of frame bar 19, is provided. This opening 30 is of larger diameter than the maximum diameter of the aforesaid toothed pivoting hub 28, and is provided along an inner portion of its periphery, approximating one-quarter of its circumference, with female ratchet teeth 31. Indenting diametrically opposite points of the marginal portions of said opening 30 are notches or passage ways 32. The height of the pivoting hub 28 corresponds substantially to the thickness of the elbow in which said opening 30 is provided, and affixed to and upon the top of said pivoting hub 28 is a keeper plate 33 of external diameter not in excess of the internal diameter of said opening. Said keeper plate is provided, in extension from diametrically opposite points of its periphery, with keeper tongues 34 of dimensions not in excess of the dimensions of said notches or passage ways 32. To assemble the frame bars 19 and 20 in interconnected relation, said bars are swung toward each other so as to bring the notches or passage ways 32 into aligned relation to the keeper tongues 34, whereby the latter, when the elbows 21 and 22 are moved together into normal lapped relation, can pass outwardly through said notches or passage ways 32 so as to be disposed outwardly of the external face of the elbow 21, whereafter, as the frame bars are swung apart, said keeper tongues 34 will lap said elbow 21, thus retaining the frame bars in operative connected together relation. To interlock the frame bars 19 and 20 in adjusted outswung relation one to the other, the elbows thereof are relatively slid one upon the other in outward direction, whereby to engage the male ratchet teeth 29 of the one with the female ratchet teeth 31 of the other, thereby to prevent relative inswinging displacement of said frame bars under any applied inswinging tension, and yet capable of being manually swung outward to any desired final angular disposition (see Fig. 3). If it is desired to release the frame bars for inswinging frame collapsing movement, the elbow portions thereof are relatively slid one upon the other in inward direction, whereby to disengage the male ratchet teeth 29 from the female ratchet teeth 31 (see Fig. 4).

The retractor frame is provided with suitably located retractor fingers or hooks to depend therefrom. Certain of said retractor fingers or hooks, such as the retractor fingers or hooks 35 (see Fig. 1), may be permanently attached to selected frame bars by pivotal or swivel connections 36. Other retractor fingers or hooks may be detachably mounted on selected frame bars in desired locations around the retractor frame. One form an arrangement of detachable retractor finger or hook (see Figs. 1 and 7) comprises a clamp member 37 to removably engage over and embrace a frame bar, to which clamp member is connected, by a pivotal or swivel connection 38, a retractor finger or hook 39; said clamp member 37 is provided with a set or clamp screw 40 threaded therethrough, and adapted, when turned home, to bind the clamp member to the frame bar desired to carry the same. Another form and arrangement of detachable retractor finger or hook (see Figs. 1, 8 and 9) comprises a clamp member 41 to removably engage over and embrace a frame bar, to which clamp member 41 is connected, by a pivotal or swivel connection 42, a retractor finger or hook 43. The clamp member 41 is provided with an extension 44 to overhang the outer margin of the frame bar to which said clamp member is attached. Mounted in said extension 44 is a turn-button fastener 45 having a cam latch portion 46 provided with a transverse straight rear edge 47. When the turn-button fastener 45 is rotated to align its straight rear edge 47 with the outer margin of said frame bar, the clamp member 41 can be lowered into place upon the latter, whereupon, by turning the turn-button fasteners, the cam latch portion 46 is moved so as to engage beneath the underside of said frame bar, thus securely affixing the retractor finger or hook thereto.

The retractor frame is also provided with an adjustably mounted, expansible supplementary retractor device for use in engaging and holding away body structures desired to be blocked off from the operational area which is defined by the retractor frame in use.

The supplementary retractor device comprises an angular supporting bracket having a horizontal, longitudinally slotted, base portion 48, which is provided at its inner end with a vertical post 49. Means is provided to detachably mount said supporting bracket upon and across a selected frame bar of the retractor frame. An illustrative from of said mounting means comprises a clamp member 50 adapted to embrace said frame bar. Said clamp member is provided, at its outer end, with a dependent tongue 51 which is adapted to overhang the outer margin of said frame bar in outwardly offset relation thereto. Threaded through said tongue 51 is a clamp screw 52 having a conical end 53 to engage beneath and with said frame bar, whereby to secure the clamp member 50 in attached relation thereto (see Fig. 10). Said clamp member 50 is provided with an upstanding screw-threaded post 54, to extend upwardly through the slotted base portion 48 of the supporting bracket. Theaded onto said post 54 is a wing nut or like fastener 55 which, when screwed home on said post, secures the supporting bracket in desired adjusted inward extension from the frame bar upon which it is mounted. Supported upon the post 49 of the supporting bracket, subject to vertical adjustment thereon, is a retractor blade structure, which depends from said post, in vertical plane parallel thereto, so as to extend downwardly through the interior of the retractor frame.

The expansible retractor blade structure, which is generally indicated by the reference character 56, comprises a pair of superposed side blades 57 and 58 of substantial length, the upper midportions of which are pivotally connected together by a pivotal support hereinafter described, and a pair of superposed bridging blades 59 and 60 which are pivotally connected with said side blades for extension between the lower end portions of the latter. Said blades are made of sheet metal (preferably stainless steel) or other suitable rigid sheet material. The lower outer corner portion of the bridging blade 59 is pivotally connected, by a pivoting rivet 61, to the lower inner corner portion of the side blade 57 in lapped relation thereto, and the lower outer corner portion of the bridging blade 60 is pivotally connnected, by a pivoting rivet 62, to the lower inner corner portion of the side blade 58 in lapped relation thereto. The lapped inner end portions of the bridging blades 59 and 60 are pivotally connected together at their mid points by a pivoting rivet 63 (see Fig. 11). Owing to the described articulated relation of the several blades of the retractor blade structure, said structure can be manipulated, to laterally expand and contract or collapse the same, by means of manipulatable finger pieces 64 and 65 which are respectively secured to the upper outer corner portions of the respective side blades 57 and 58. From a collapsed condition of the retractor blade structure, wherein the blade components thereof are swung together in vertically aligned superposed relation, as shown in Fig. 12, said blade components can be relatively moved so as to spread the retractor blade structure to an operative expanded condition, as shown in Fig. 11. Expanding movements are imparted to the blade components by pressing the finger pieces 64 and 65 one toward the other, until they abut. Such manipulation of the finger pieces outswing the side blades 57 and 58 about the pivotal means by which the same are supported. The outswinging movements of the lower end portions of the side blades 57 and 58 are transmitted, through the pivotal connections 61 and 62 to the bridging blades 59 and 60, thereby causing the inner meeting end portions of the latter to turn about the pivoting rivet 63, so as to be swung down to horizontal disposition in extension between the spread lower end portions of said side blades 57 and 58 (see Fig. 11). The retractor blade structure can be collapsed to initial folded position shown in Fig. 12, by reversing the above described manipulation.

The pivotal means, by which the retractor blade structure is supported from the post 49 of the supporting bracket, comprises a sleeve 66 slidably mounted on said post 49. Extending rearwardly through the lapped upper end portions of the side blades 57 and 58 of the retractor blade structure is a combined pivoting and set screw element 67, which is threaded through the front wall of said sleeve 66 to engage said post 49, thus not only pivotally supporting the retractor blade structure, but also holding the same in a desired vertically adjusted position to depend through the interior of the retractor frame. Interposed between the sleeve 66 and the retractor blade structure is a bowed perforate spring washer 68, which frictionally engages the retractor blade structure, whereby to yieldably hold the same in either its collapsed condition or in an expanded condition to which it may be adjusted.

In the use of the incisional retractor of this invention, after the surgeon makes an incision, as e. g. in an abdominal wall, the collapsed retractor frame having been adjusted as to length by desirably moving the sections thereof relative one to the other and thereupon securing the same in adjusted relation by the coupler members 24, the frame is applied over the abdomen, so that retractor fingers or hooks carried by the frame bars pass through the incision to engage opposed margins thereof. The frame so applied is now laterally expanded to a desired degree whereby to expose the operational area framed thereby, and so that the retractor fingers or hooks will draw back and hold spread open the margins of the incision. As the frame bars 19 and 20 are swung apart by expanding the frame, the male ratchet teeth 29 engage the female ratchet teeth 31 at the pivotal joint between said frame bars. Said interengaged ratchet teeth 29 and 31 now function to resist the tensional inswinging thrust exercised by the spread margins of the incision upon the retractor fingers or hooks, whereby to automatically hold the retractor frame against displacement from the desired expanded condition to which it is adjusted.

To assure against collapse of the expanded retractor frame should the ratchet teeth 29 and 31 of the pivotal connection between the frame bars 19 and 20 be accidentally disengaged, additional releasable means is provided, if desired, for positively locking the retractor frame against collapse from an operative expanded condition thereof in use. A preferred form of such safety locking means, as shown, is provided in connection with the pivotally joined ends of the frame bars 15 and 16, and comprises an arcuate arm 69 which outwardly projects from the pivoted end of the frame bar 15. Mounted in connection with the free end portion of said arm 69, in rotative swiveling relation thereto, is a perpendicular knuckle member 70, having an annular flange 71 to seat upon the upper face of said arm 69, so that said knuckle member 70 depends from the underside of said arm 69. Pivoted by its upturned pivoting stud 72, with which its inner end is provided, in connection with the frame bar 16, and in suitably spaced relation inwardly from the pivoted connection of the latter with the frame bar 15, is an outwardly projecting lock bar 73, which extends outwardly through a transverse opening 74 with which the knuckle member 70 is provided. Said lock bar 73 is provided, on its upper side, with a tapered face 75, which inclines downwardly and inwardly from its outer free end toward its inner pivoted end. Threaded to extend axially downward through the knuckle member 70 is a lock screw 76 for releasable engagement with said tapered face 75 of the lock bar 73. When the retractor frame is expanded in required incision spreading condition, as above described, the lock bar 73 will be accordingly moved through and relative to the knuckle member 70, whereupon the lock screw 76 is turned home against the tapered face 75 of the lock bar, thereby positively locking the arm 69 against movement relative to the lock bar 73, and thus positively locking the frame bars 15 and 16 against inswinging movements from the outswung positions to which they have been moved by required expansion of the retractor frame. Owing to the tapered formation of the lock bar 73, outward slip or displacement of the lock bar relative to the tightened lock screw 76 is positively obstructed, and consequently inswinging collapsing movements of the frame bars of the retractor frame is likewise positively prevented, so that the retractor frame can not be accidentally collapsed during incision spreading use thereof.

Having now described our invention, we claim:

1. A surgical retractor comprising an expansible retractor frame formed by oppositely extending sections, each section comprising a pair of frame bars pivotally joined at their outer ends, the inner end portions of corresponding frame bars of respective sections being engaged in meeting relation for relative pivotal and longitudinal movements, whereby to permit adjustment of the retractor frame as to initial length, coupling means pivotally mounted on an end portion of one of each pair of engaged frame bars to slidably receive that of the other, said coupling means including means to releasably secure the meeting end portions of said frame bars in relatively longitudinally adjusted condition, the joined outer ends of the frame bars of one section of the retractor frame having cooperative interengageable male and female ratchet teeth adapted, when engaged, to automatically hold the retractor frame sections in laterally expanded condition, to which the retractor frame is adjusted, and incision spreading retractor fingers depending from the retractor frame.

2. A surgical retractor according to claim 1, including a laterally expansible supplementary retractor device mounted on the retractor frame for perpendicular disposition within the interior thereof, comprising a supporting bracket, means attaching said supporting bracket on a selected frame bar of the retractor frame, and a retractor blade structure comprising superposed side blades pivotally connected by their upper mid portions to the supporting bracket for suspension therefrom, and a pair of superposed bridging blades pivotally connected together at the mid portions of their inner ends and respectively pivotally connected at the lower outer corner portions to lower inner corner portions of respective side blades.

3. A surgical retractor comprising an expansible retractor frame to support incision spreading retractor fingers in desired locations thereon, said retractor frame being formed by oppositely extending sections, each section comprising a pair of frame bars pivotally joined at their outer ends, means pivotally connecting together lapped inner end portions of corresponding frame bars of respective sections, the joined outer ends of the frame bars of one section having cooperative means to automatically but releasably hold the retractor frame sections in laterally expanded condition to which the retractor frame is adjusted, said latter means comprising a pivoting hub upstanding from the outer end portion of one of said last mentioned frame bars, said hub having male ratchet teeth extending along the outer half of its circumference, the outer end portion of the other of said last mentioned frame bars having an opening into which said hub projects, said opening exceeding in diameter the diameter of said hub, to permit lateral movement of said hub within said opening, the margin of said opening having female ratchet teeth extending along an inner portion thereof approximating one quarter of the circumference of said opening, said ratchet teeth being operatively engaged by lateral movement of the hub within said opening in one direction and disengaged by lateral movement of the hub within said opening in the opposite direction, and keeper means affixed to the external end of said hub to retain the outer ends of said last mentioned frame bars against accidental separation from their operative joined relation.

4. A surgical retractor according to claim 3, including a laterally expansible supplementary retractor device mounted on the retractor frame for perpendicular disposition within the interior thereof, comprising a supporting bracket, means attaching said supporting bracket on a selected frame bar of the retractor frame, and a retractor blade structure comprising superposed side blades pivotally connected by their upper mid portions to the supporting bracket for suspension therefrom, and a pair of superposed bridging blades pivotally connected together at the mid portions of their inner ends and respectively pivotally connected at their lower outer corner portions to lower inner corner portions of respective side blades.

5. A surgical retractor according to claim 3, including safety locking means for additionally holding the retractor frame sections in laterally expanded condition to which the retractor frame is adjusted, comprising an outwardly extending arm projecting from the pivoted end of one of the frame bars of the other section of the retractor frame, a rotatable knuckle member mounted on said arm, a lock bar pivotally connected with the other frame bar of said last mentioned section of the retractor frame to slidably extend therefrom through said knuckle member, and a lock screw threaded axially through the knuckle member to releaseably engage said lock bar.

6. A surgical retractor according to claim 5 wherein the lock bar of said safety locking means is tapered from its outer end towards its inner end.

7. A surgical retractor comprising an expansible retractor frame formed by oppositely extending sections, each section comprising a pair of frame bars pivotally joined at their outer ends, the inner end portions of corresponding frame bars of respective sections being engaged in meeting relation for relative pivotal and longitudinal movements, whereby to permit adjustment of the retractor frame as to initial length, comprising coupling means pivotally mounted on an end portion of one of each pair of engaged frame bars to slidably receive that of the other, said coupling means including means to releasably secure the meeting end portions of said frame bars in relatively longitudinally adjusted condition, incision spreading retractor fingers depending from the retractor frame, and safety locking means for holding the retractor frame sections in laterally expanded condition to which the retractor frame is adjusted, comprising an outwardly extending arm projecting from the pivoted end of one of the frame bars of one section of the retractor frame, a rotatable knuckle member mounted on said arm, a lock bar pivotally connected with the other frame bar of said last mentioned section of the retractor frame to slidably extend therefrom through said knuckle member, and a lock screw threaded axially through the knuckle member to releasably engage said lock bar.

8. A surgical retractor according to claim 7 wherein the lock bar of said safety locking means is tapered from its outer end towards its inner end.

9. In a surgical retractor, in combination with the frame thereof, a laterally expansible supplementary retractor device adapted to be mounted on said frame for perpendicular disposition within the interior thereof, comprising a supporting bracket, means to attach said supporting bracket to the frame, and a retractor blade structure comprising superposed side blades pivotally connected by their upper mid portions to the supporting bracket for suspension therefrom, and a pair of superposed bridging blades pivotally connected together at the mid portions of their inner ends and respectively pivotally connected at their lower outer corner portions to lower inner corner portions of respective side blades.

References Cited in the file of this patent

UNITED STATES PATENTS

| 1,919,120 | O'Connor et al. | July 18, 1933 |
| 2,053,868 | Grosso | Sept. 8, 1936 |
| 2,473,266 | Wexler | June 14, 1949 |
| 2,541,516 | Ivory et al. | Feb. 13, 1951 |

FOREIGN PATENTS

| 824,754 | France | Nov. 18, 1937 |